US011299001B2

(12) United States Patent
Ohno et al.

(10) Patent No.: US 11,299,001 B2
(45) Date of Patent: Apr. 12, 2022

(54) ELECTRICALLY POWERED SUSPENSION SYSTEM

(71) Applicant: HONDA MOTOR CO., LTD., Tokyo (JP)

(72) Inventors: Satoshi Ohno, Wako (JP); Atsuhiko Yoneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 131 days.

(21) Appl. No.: 16/846,498

(22) Filed: Apr. 13, 2020

(65) Prior Publication Data

US 2020/0324605 A1 Oct. 15, 2020

(30) Foreign Application Priority Data

Apr. 12, 2019 (JP) ............................ JP2019-076548

(51) Int. Cl.
*B60G 17/00* (2006.01)
*B60G 17/015* (2006.01)
(Continued)

(52) U.S. Cl.
CPC ....... *B60G 17/0157* (2013.01); *B60G 17/016* (2013.01); *B60G 17/018* (2013.01);
(Continued)

(58) Field of Classification Search
CPC .............. B60G 17/0157; B60G 17/016; B60G 17/0162; B60G 17/0165; B60G 17/018;
(Continued)

(56) References Cited

U.S. PATENT DOCUMENTS 5,987,368 A * 11/1999 Kamimae ............ B60G 17/015 280/5.515
7,722,056 B2 * 5/2010 Inoue ..................... B60G 13/14 280/5.512

(Continued)

FOREIGN PATENT DOCUMENTS

JP 2009-132237 A 6/2009
JP 2017-165243 A 9/2017

(Continued)

OTHER PUBLICATIONS

Office Action received in corresponding Japanese application No. 2019-076548 dated Dec. 22, 2020 with English translation (8 pages).

*Primary Examiner* — Tyler J Lee
(74) *Attorney, Agent, or Firm* — Rankin, Hill & Clark LLP

(57) ABSTRACT

An electrically powered suspension system includes: an electromagnetic actuator configured to generate a driving force related to vibration damping of the vehicle; an information acquisition unit configured to acquire information on a stroke velocity of the electromagnetic actuator; a target damping force calculation unit configured to calculate a target damping force based on the stroke velocity; a drive control unit configured to control driving of the electromagnetic actuator based on the target damping force; and a filter processing unit configured to perform a filtering process by applying a predetermined filtering characteristic to the stroke velocity. The filter processing unit has a plurality of filtering characteristics set in a second frequency region, which has a frequency higher than that of a first frequency region. The filter processing unit selectively applies, among (Continued)

the plurality of filtering characteristics, one filtering characteristic that is based on the stroke velocity to the stroke velocity.

10 Claims, 9 Drawing Sheets

(51) Int. Cl.
*B60G 17/016* (2006.01)
*B60G 17/018* (2006.01)

(52) U.S. Cl.
CPC ...... *B60G 2202/42* (2013.01); *B60G 2400/25* (2013.01); *B60G 2600/17* (2013.01); *B60G 2600/60* (2013.01)

(58) Field of Classification Search
CPC ................ B60G 17/06; B60G 2202/42; B60G 2400/0523; B60G 2400/102; B60G 2400/204; B60G 2400/25; B60G 2400/252; B60G 2400/30; B60G 2500/10; B60G 2600/17; B60G 2600/182; B60G 2600/60; B60G 2800/162
See application file for complete search history.

(56) References Cited

U.S. PATENT DOCUMENTS

| | | | | |
|---|---|---|---|---|
| 8,793,052 | B2 * | 7/2014 | Inoue | B60G 17/015 701/37 |
| 9,857,776 | B2 * | 1/2018 | Watai | G05B 13/02 |
| 10,744,839 | B2 * | 8/2020 | Ohno | B60G 17/0157 |
| 2009/0026989 | A1 * | 1/2009 | Kubota | H02P 25/06 318/400.02 |
| 2009/0079145 | A1 * | 3/2009 | Inoue | B60G 17/06 280/5.515 |
| 2010/0204885 | A1 | 8/2010 | Kajino et al. | |
| 2011/0218707 | A1 * | 9/2011 | Inoue | B60G 17/06 701/37 |
| 2012/0070013 | A1 * | 3/2012 | Vau | G10K 11/17854 381/71.4 |
| 2014/0032044 | A1 * | 1/2014 | Watai | F16F 15/005 701/36 |
| 2017/0267051 | A1 * | 9/2017 | Toyohira | B60G 17/018 |
| 2018/0297434 | A1 | 10/2018 | Ohno et al. | |
| 2018/0361813 | A1 | 12/2018 | Ohno et al. | |
| 2018/0361816 | A1 * | 12/2018 | Ohno | B60G 17/06 |

FOREIGN PATENT DOCUMENTS

| | | |
|---|---|---|
| JP | 6417443 81 | 11/2018 |
| JP | 2019-001368 A | 1/2019 |

* cited by examiner

ELECTRICALLY POWERED SUSPENSION SYSTEM

CROSS-REFERENCE TO RELATED APPLICATION

This application claims the benefit of foreign priority to Japanese Patent Application No. 2019-076548, filed on Apr. 12, 2019, which is incorporated by reference in its entirety.

TECHNICAL FIELD

The present invention relates to an electrically powered suspension system including an electromagnetic actuator. The electromagnetic actuator is installed between a vehicle body and a wheel of a vehicle, and generates a driving force related to vibration damping of the vehicle.

BACKGROUND ART

An electrically powered suspension system including an electromagnetic actuator has conventionally been known. The electromagnetic actuator of this electrically powered suspension system is installed between a vehicle body and a wheel of a vehicle, and generates a driving force related to vibration damping of the vehicle. The electromagnetic actuator includes a ball screw mechanism in addition to the electric motor. The electromagnetic actuator operates to generate a driving force related to the damping operation by converting rotary motion of the electric motor into linear motion of the ball screw mechanism.

Herein, the term "driving force related to the damping operation" means a damping force. The damping force indicates a force (counter force) in a direction opposite to the direction of the stroke velocity of the electromagnetic actuator.

To provide ride comfort and steering stability of a vehicle, there is a strong demand to prevent an electrically powered suspension system from going into full-bump and full-rebound.

In order to satisfy such a demand, a conventional electrically powered suspension system includes: an electromagnetic actuator disposed in parallel with a spring member installed between a vehicle body and a wheel of a vehicle and configured to generate a driving force related to a damping operation; an information acquisition unit configured to acquire a stroke position of the electromagnetic actuator; and an ECU configured to set a target damping force of the electromagnetic actuator and to control driving of the electromagnetic actuator using a target driving force obtained based on the thus set target damping force.

The ECU corrects the target driving force such that, when the stroke position is in an end region close to the stroke end, the stroke position shifts from the end region toward a neutral region.

According to this electrically powered suspension system, it is possible to prevent the vehicle from going into full-bump or full-rebound in an extreme driving situation.

SUMMARY

However, this conventional electrically powered suspension system does not reflect a vibration suppression control for satisfying stability and responsiveness of the system control when vibration is input to the electromagnetic actuator.

Accordingly, there is a room for further improvement in the conventional electrically powered suspension system relative to the following point. Specifically, if a particular importance is attached to the responsiveness relative to the stability of the system control, the system may go into a vibration state as a result of poor stability of the control. On the contrary, if a particular importance is attached to the stability relative to the responsiveness of the system control, vibration of the vehicle generated near a resonance point is not sufficiently suppressed as a result of poor responsiveness of the control.

The present invention has been made in view of the above circumstances, and an object of the present invention is to provide an electrically powered suspension system capable of sufficiently suppressing vibration of a vehicle while satisfying stability and responsiveness of the system control and avoiding the system going into a vibration state when vibration is input to the electromagnetic actuator.

In a first aspect, the present invention relates to an electrically powered suspension system comprising: an electromagnetic actuator disposed between a vehicle body and a wheel of a vehicle and configured to generate a driving force related to vibration damping of the vehicle; an information acquisition unit configured to acquire information on a stroke velocity of the electromagnetic actuator; a target damping force calculation unit configured to calculate a target damping force that is a target value for a damping operation of the electromagnetic actuator based on the stroke velocity; a drive control unit configured to control driving of the electromagnetic actuator based on the target damping force; and a filter processing unit configured to perform a filtering process by applying a predetermined filtering characteristic to the stroke velocity, wherein the filter processing unit has a plurality of filtering characteristics set in a second frequency region, which has a frequency higher than that of a first frequency region containing a sprung resonance frequency and an unsprung resonance frequency, and wherein the filter processing unit selectively applies, among the plurality of filtering characteristics, one filtering characteristic that is based on the stroke velocity to the stroke velocity.

In a second aspect, the present invention relates to an electrically powered suspension system comprising: an electromagnetic actuator disposed between a vehicle body and a wheel of a vehicle and configured to generate a driving force related to vibration damping of the vehicle; an information acquisition unit configured to acquire information on a stroke velocity of the electromagnetic actuator; a target damping force calculation unit configured to calculate a target damping force that is a target value for a damping operation of the electromagnetic actuator based on the stroke velocity; a drive control unit configured to control driving of the electromagnetic actuator based on the target damping force; and a filter processing unit configured to perform a filtering process by applying a predetermined filtering characteristic to the stroke velocity, wherein the filter processing unit has a plurality of filtering characteristics set in a second frequency region, which has a frequency higher than that of a first frequency region containing a sprung resonance frequency and an unsprung resonance frequency, and wherein the filter processing unit selectively applies, among the plurality of filtering characteristics, one filtering characteristic that is based on a rate of change of the target damping force relative to the stroke velocity to the stroke velocity.

In a third aspect, the present invention relates to an electrically powered suspension system comprising: an electromagnetic actuator disposed between a vehicle body and a wheel of a vehicle and configured to generate a driving force related to vibration damping of the vehicle; an information acquisition unit configured to acquire information on a stroke velocity of the electromagnetic actuator; a characteristic information storage unit configured to store, in association with a magnitude of the stroke velocity, a plural pieces of characteristic information each having a specific filtering characteristic to be applied to the information on the stroke velocity; a filter processing unit configured to acquire characteristic information having a specific filtering characteristic suitable for the stroke velocity based on the stroke velocity and a storage content of the characteristic information storage unit, and to apply a filtering process to the information on the stroke velocity acquired by the information acquisition unit by applying a filtering process related to the acquired characteristic information; a target damping force calculation unit configured to calculate a target damping force that is a target value for a damping operation of the electromagnetic actuator based on the stroke velocity having filter processed by the filter processing unit and information on a relationship between the thus filter processed stroke velocity and the damping force; and a drive control unit configured to control driving of the electromagnetic actuator based on the calculated target damping force, wherein the plural pieces of characteristic information are set in a second frequency region, which has a frequency higher than that of a first frequency region containing a sprung resonance frequency and an unsprung resonance frequency, such that each characteristic information has a specific filtering characteristic.

In a fourth aspect, the present invention relates to an electrically powered suspension system comprising: an electromagnetic actuator disposed between a vehicle body and a wheel of a vehicle and configured to generate a driving force related to vibration damping of the vehicle; an information acquisition unit configured to acquire information on a stroke velocity of the electromagnetic actuator; a change rate information storage unit configured to store, in association with a magnitude of the stroke velocity, a change rate data that is information on a rate of change of a target damping force relative to a change in the stroke velocity; a characteristic information storage unit configured to store, in association with the change rate data based on the stroke velocity, a plural pieces of characteristic information each having a specific filtering characteristic to be applied to the information on the stroke velocity; a filter processing unit configured to acquire characteristic information having a specific filtering characteristic suitable for the change rate data, based on the change rate data on the basis of the stroke velocity and based on a storage content of the characteristic information storage unit, and to apply a filtering process to the information on the stroke velocity acquired by the information acquisition unit by applying a filtering process related to the acquired characteristic information; a target damping force calculation unit configured to calculate a target damping force that is a target value for a damping operation of the electromagnetic actuator based on the stroke velocity having filter processed by the filter processing unit and information on a relationship between the thus filter processed stroke velocity and the damping force; and a drive control unit configured to control driving of the electromagnetic actuator based on the calculated target damping force, wherein the plural pieces of characteristic information are set in a second frequency region, which has a frequency higher than that of a first frequency region containing a sprung resonance frequency and an unsprung resonance frequency, such that each characteristic information has a specific filtering characteristic.

BRIEF DESCRIPTION OF THE DRAWINGS

The drawings described herein are for illustration purposes only and are not intended to limit the scope of the present disclosure in any way.

DETAILED DESCRIPTION OF THE INVENTION

Figure 1:
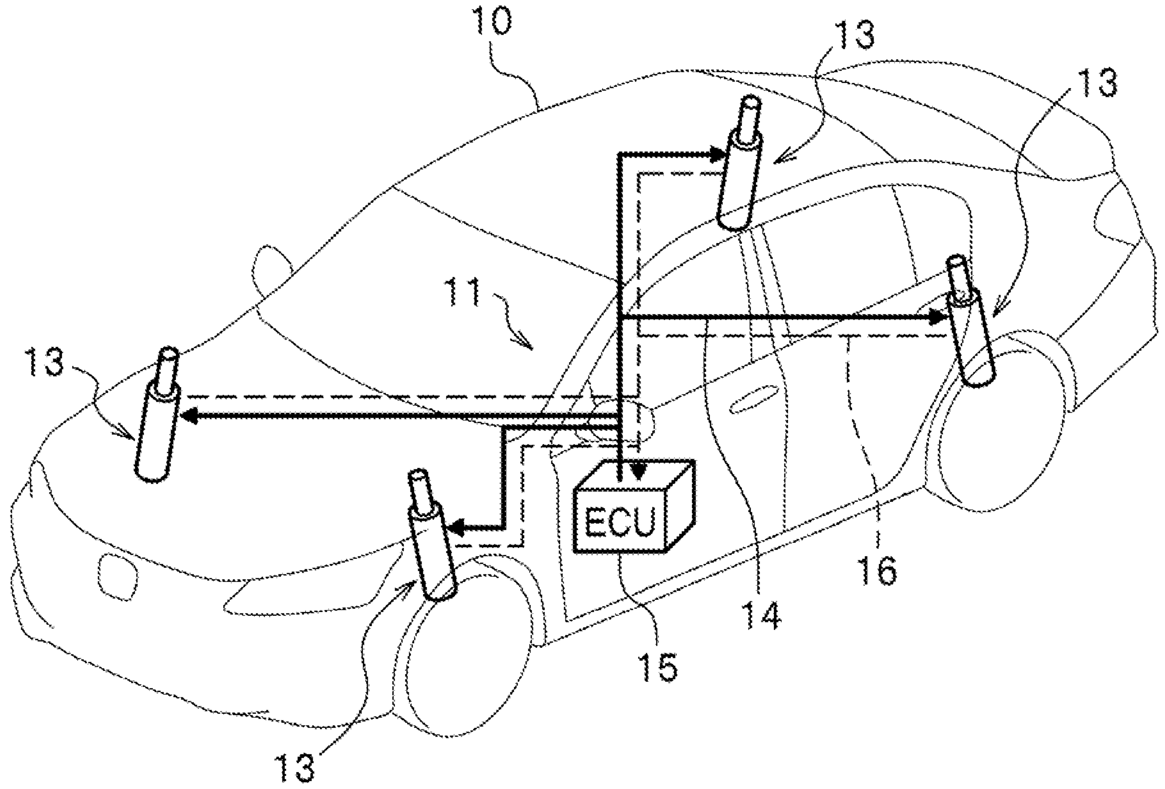
FIG. 1 is a diagram showing an overall configuration of an electrically powered suspension system according to one embodiment of the present invention.

An electrically powered suspension system according to one embodiment of the present invention will be described in detail with reference to the drawings.

In the following drawings, the same reference numeral is assigned to components each having a common function. In addition, the size and shape of a component may be schematically illustrated by being deformed or exaggerated for convenience of explanation.

<Common Basic Configuration of an Electrically Powered Suspension System 11 According to One Embodiment of Present Invention>

First, a basic configuration of an electrically powered suspension system 11 according to one embodiment of the present invention will be described with reference to FIGS. 1 and 2.

FIG. 1 is a diagram showing the overall configuration of an electrically powered suspension system 11 according to one embodiment of the present invention. FIG. 2 is a partially sectional view of an electromagnetic actuator 13 constituting the electrically powered suspension system 11.

As seen in FIG. 1, the electrically powered suspension system 11 according to this embodiment includes a plurality of electromagnetic actuators 13 respectively provided for wheels of a vehicle 10, and an electronic control unit (hereinafter referred to as an "ECU") 15. The plurality of electromagnetic actuators 13 and the ECU 15 are connected to each other via a power supply line 14 (see a solid line in FIG. 1) for supplying drive control power from the ECU 15 to the plurality of electromagnetic actuators 13 and via a signal line 16 (see a dashed line in FIG. 1) for transmitting a rotation angle signal of an electric motor 31 (see FIG. 2) from each of the plurality of electromagnetic actuators 13 to the ECU 15.

In this embodiment, four electromagnetic actuators 13 are respectively provided for the wheels including front wheels (front right wheel, front left wheel) and rear wheels (rear right wheel, rear left wheel). The electromagnetic actuators 13 provided for the wheels are independently controlled to drive in synchronization with extension and contraction at the corresponding wheels.

Unless otherwise stated, each of the plurality of electromagnetic actuators 13 has a common configuration in the embodiment. Therefore, the plurality of electromagnetic actuators 13 will be described by describing a configuration of one electromagnetic actuator 13.

Figure 2:
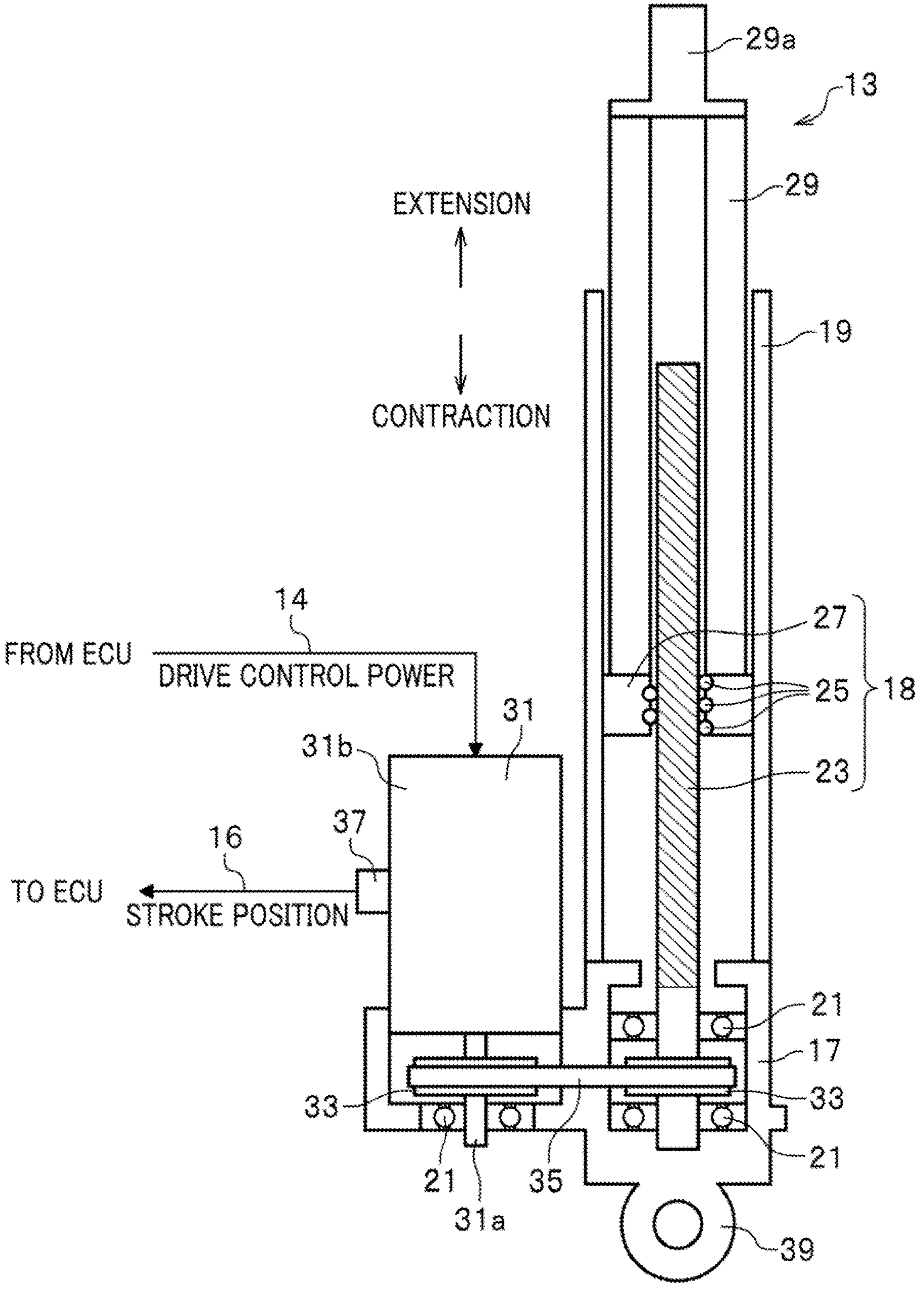
FIG. 2 is a partially sectional view of an electromagnetic actuator equipped in the electrically powered suspension system.

As seen in FIG. 2, the electromagnetic actuator 13 includes a base housing 17, an outer tube 19, a ball bearing 21, a ball screw shaft 23, a plurality of balls 25, a nut 27, and an inner tube 29.

The base housing 17 supports a base portion of the ball screw shaft 23 axially rotatably via the ball bearing 21. The outer tube 19 is provided on the base housing 17 and accommodates a ball screw mechanism 18 including the ball screw shaft 23, the plurality of balls 25, and the nut 27. The plurality of balls 25 roll along a screw groove of the ball screw shaft 23. The nut 27 is engaged with the ball screw shaft 23 via the plurality of balls 25, and converts rotational motion of the ball screw shaft 23 into linear motion. The inner tube 29 connected to the nut 27 is integrated with the nut 27 and displaceable in an axial direction of the outer tube 19.

As seen in FIG. 2, the electromagnetic actuator 13 includes the electric motor 31, a pair of pulleys 33, and a belt member 35 in order to transmit a rotary drive force to the ball screw shaft 23. The electric motor 31 is provided on the base housing 17 so as to be arranged in parallel with the outer tube 19. The pulleys 33 are respectively attached to a motor shaft 31*a* of the electric motor 31 and the ball screw shaft 23. The belt member 35 for transmitting the rotary drive force of the electric motor 31 to the ball screw shaft 23 is looped between the pair of pulleys 33.

The electric motor 31 is provided with a resolver 37 for detecting a rotation angle signal of the electric motor 31. The rotation angle signal of the electric motor 31 detected by the resolver 37 is sent to the ECU 15 via the signal line 16. The electric motor 31 is controlled to be rotationally driven by the ECU 15 in accordance with the drive control power to be supplied to each of the plurality of electromagnetic actuators 13 via the power supply line 14.

According to this embodiment, as seen in FIG. 2, a dimension in the axial direction of the electromagnetic actuator 13 is shortened by employing a layout in which the motor shaft 31*a* of the electric motor 31 and the ball screw shaft 23 are arranged substantially in parallel and connected to each other. However, another layout may be employed in which the motor shaft 31*a* of the electric motor 31 and the ball screw shaft 23 are coaxially arranged and connected to each other.

As seen in FIG. 2, the electromagnetic actuator 13 according to this embodiment has a connecting portion 39 provided at a lower end of the base housing 17. The connecting portion 39 is connected and fixed to an unsprung member (not shown) such as a lower arm and a knuckle provided on the wheel. On the other hand, an upper end portion 29*a* of the inner tube 29 is connected and fixed to a sprung member (not shown) such as a strut tower portion provided on the vehicle body. In other words, the electromagnetic actuator 13 is arranged in parallel with a spring member (not shown) provided between the vehicle body and the wheel of the vehicle 10.

The electromagnetic actuator 13 configured as described above operates as follows. For example, it is assumed that momentum related to upward vibration is inputted to the connecting portion 39 from the wheel of the vehicle 10. In this case, the inner tube 29 and the nut 27 try to integrally descend with respect to the outer tube 19 to which the momentum related to the upward vibration has been applied. In response to this, the ball screw shaft 23 tries to rotate in a direction following the nut 27 descending. At this time, the rotary drive force of the electric motor 31 in a direction preventing the nut 27 from descending is generated. The rotary drive force of the electric motor 31 is transmitted to the ball screw shaft 23 via the belt member 35.

In this way, the vibration transmitted from the wheel to the vehicle body is attenuated by applying a reaction force (damping force) that is against the momentum related to the upward vibration to the ball screw shaft 23.

<Internal Configuration of ECU 15>

Figure 3:
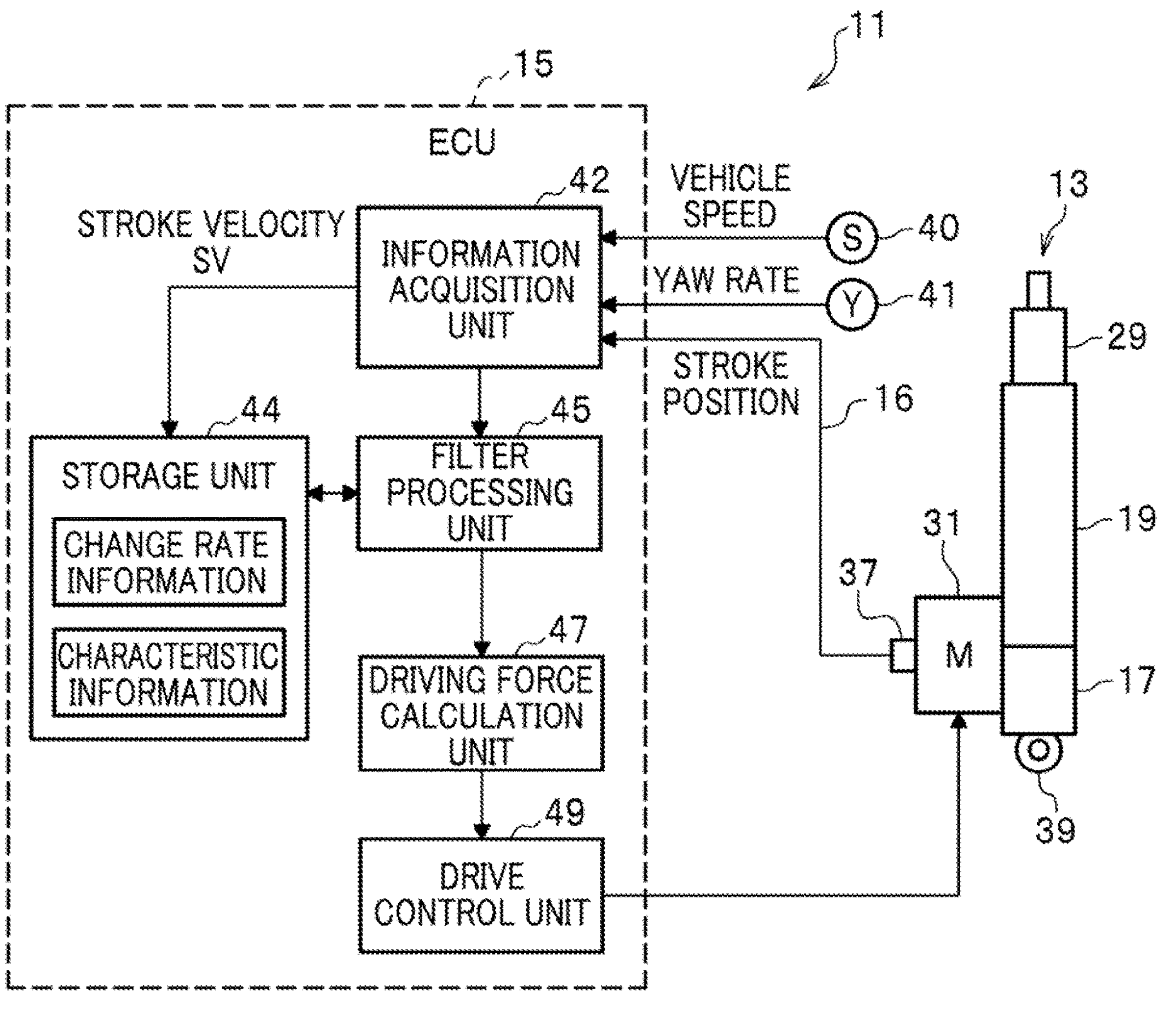
FIG. 3 is a diagram showing an internal configuration and a peripheral configuration of an ECU equipped in the electrically powered suspension system.

Next, an internal configuration and a peripheral configuration of the ECU 15 equipped in the electrically powered suspension system 11 will be described with reference to FIG. 3. FIG. 3 is a diagram showing the internal configuration and the peripheral configuration of the ECU 15 equipped in the electrically powered suspension system 11.

The ECU 15 includes a microcomputer configured to perform various arithmetic processing. The ECU 15 has a drive control function of generating a driving force related to vibration damping of the vehicle body by controlling driving of each of the plurality of electromagnetic actuators 13, for example, based on a rotation angle signal of the electric motor 31 detected by the resolver 37.

In order to achieve this drive-controlling function, as seen in FIG. 3, the ECU 15 includes an information acquisition unit 42, a storage unit 44, a filter processing unit 45, a driving force calculation unit 47, and a drive control unit 49.

The information acquisition unit 42 acquires the rotation angle signal of the electric motor 31 detected by the resolver 37 as information on a stroke position, and acquires information on a stroke velocity SV by time-differentiating the stroke position. Further, as seen in FIG. 3, the information acquisition unit 42 acquires a vehicle speed detected by a vehicle speed sensor 40, and information on a yaw rate detected by a yaw rate sensor 41. The stroke velocity SV, the vehicle speed, and the information on the yaw rate that are acquired by the information acquisition unit 42 are sent to the storage unit 44 and the filter processing unit 45.

The storage unit 44 including a gain-phase compensation filter 51 (see FIG. 4A) stores, in association with the magnitude of the stroke velocity SV, a plural pieces of characteristic information SPC1, SPC2 (see FIG. 4D; to be described later) each having a specific filtering characteristic (gain characteristic and phase characteristic) to be applied to time-series information on the stroke velocity SV.

The storage content of the storage unit 44 with respect to the plural pieces of characteristic information SPC1, SPC2 is referred to when characteristic information having a specific filtering characteristic (gain characteristic and phase characteristic) suitable for the stroke velocity SV acquired by the information acquisition unit 42 is acquired.

The storage unit 44 may be configured to store, in association with the magnitude of the stroke velocity SV, a change rate data that is information on a rate of change (degree of change) of the target damping force relative to a change in the stroke velocity SV.

The storage content of the storage unit 44 with respect to the change rate data is referred to when the change rate data corresponding to the stroke velocity SV acquired by the information acquisition unit 42 is acquired.

The ECU 15 may be configured to acquire, at intervals of a predetermined control cycle, the amount of change in a stroke velocity ΔSV and the amount of change in a target damping force ΔF when acquiring the change rate data that is information on a rate of change of the target damping force relative to the stroke velocity SV, and at each time, to calculate the rate of change of the target damping force relative to the stroke velocity SV using the following equation (1).

$$G=\Delta F/\Delta SV \qquad \text{Equation 1}$$

where G is a rate of change of a target damping force relative to a stroke velocity SV, ΔSV is the amount of change in the stroke velocity SV at intervals of a predetermined control cycle, and ΔF is the amount of change in the target damping force at intervals of the predetermined control cycle.

Further, the storage unit 44 may be configured to store, in association with the change rate data based on the stroke velocity SV, plural pieces of characteristic information SPC1, SPC2 each having a specific filtering characteristic (gain characteristic and phase characteristic) to be applied to time-series information on a stroke velocity SV.

The storage content of the storage unit 44 with respect to the plural pieces of characteristic information SPC1, SPC2 is referred to when characteristic information having a specific filtering characteristic (gain characteristic and phase characteristic) suitable for the change rate data that is based on the stroke velocity SV acquired by the information acquisition unit 42 is acquired.

The storage unit 44 corresponds to a "change rate information storage unit" and a "characteristic information storage unit" according to the present invention.

The filter processing unit 45 performs a filtering process to apply to a time-series signal of the stroke velocity SV acquired by the information acquisition unit 42 a filtering characteristic (gain characteristic and phase characteristic) related to the characteristic information read out from the storage unit 44, and then outputs a filtered stroke velocity signal in which the gain and the phase have been corrected to a frequency characteristic suitable for the stroke velocity SV at that time. The filtered stroke velocity signal processed by the filter processing unit 45 is sent to the driving force calculation unit 47.

It should be noted that the filter processing unit 45 may be configured by an analog circuit or a digital circuit (digital filter). Further, it should be noted that the filter processing unit 45 may be configured by a software or a hardware, or by a combination of a software and a hardware.

The driving force calculation unit 47 receives the filtered stroke velocity signal and calculates a target damping force with reference to the stroke velocity signal and a damping force map 46 (see FIGS. 4A and 4C) that is information on the relationship between a change in the stroke velocity SV and the damping force, and then calculates a drive control signal to achieve the target damping force. The target drive control signal that is a calculation result of the driving force calculation unit 47 is sent to the drive control unit 49.

The driving force calculation unit 47 corresponds to a "target damping force calculation unit" according to the present invention.

The drive control unit 49 supplies a drive control power to an electric motor 31 provided in each of the plurality of electromagnetic actuators 13 according to the drive control signal sent from the driving force calculation unit 47, and thus independently controls driving of each of the plurality of electromagnetic actuators 13. For example, an inverter control circuit is suitably used for generating the drive control power to be supplied to the electric motor 31.

<Internal Configuration of the ECU 15 Equipped in the Electrically Powered Suspension System 11>

Figure 4A:
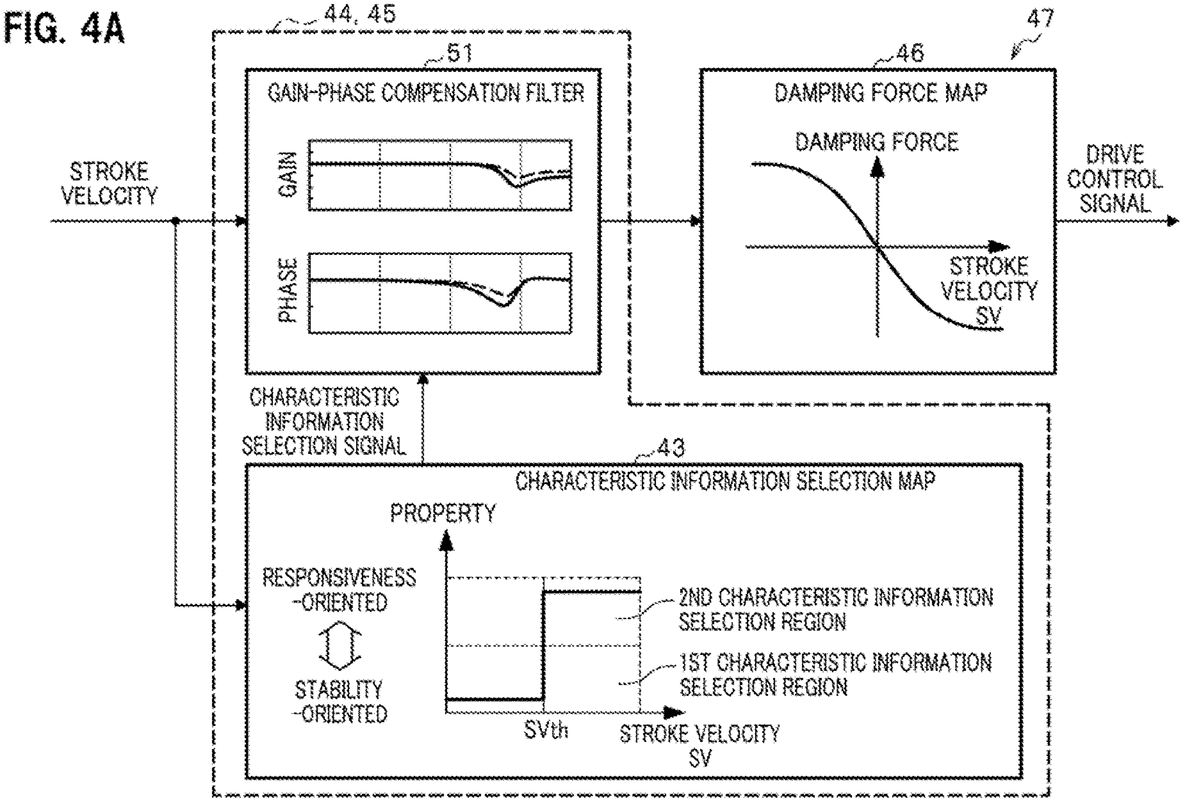
FIG. 4A is a diagram conceptually illustrating an internal configuration of the ECU equipped in the electrically powered suspension system.
Figure 4B:
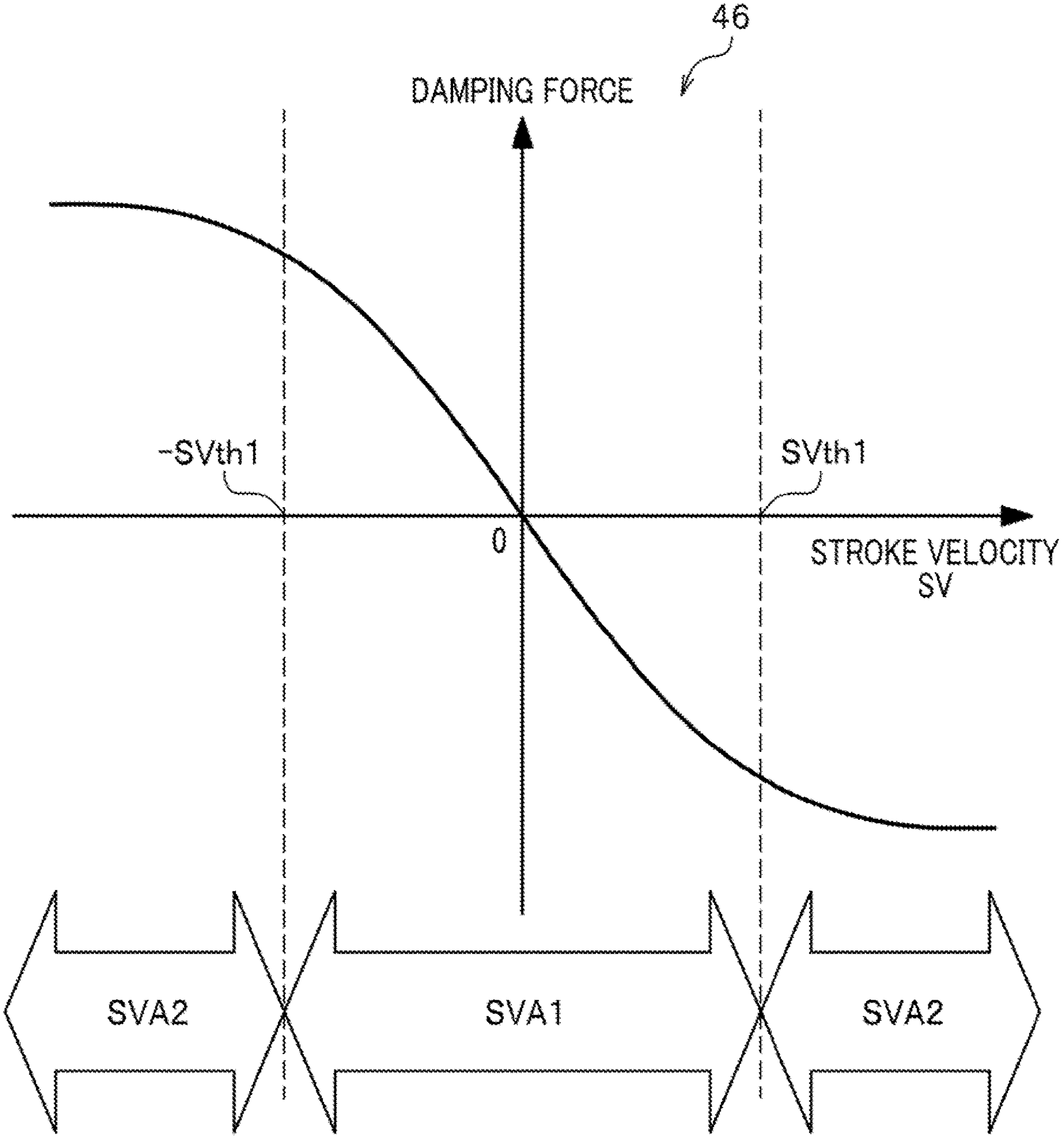
FIG. 4B explains a damping force map representing a relationship between information on a stroke velocity and a damping force, which damping force map is used in calculating a damping force suitable for a stroke velocity.
Figure 4C:
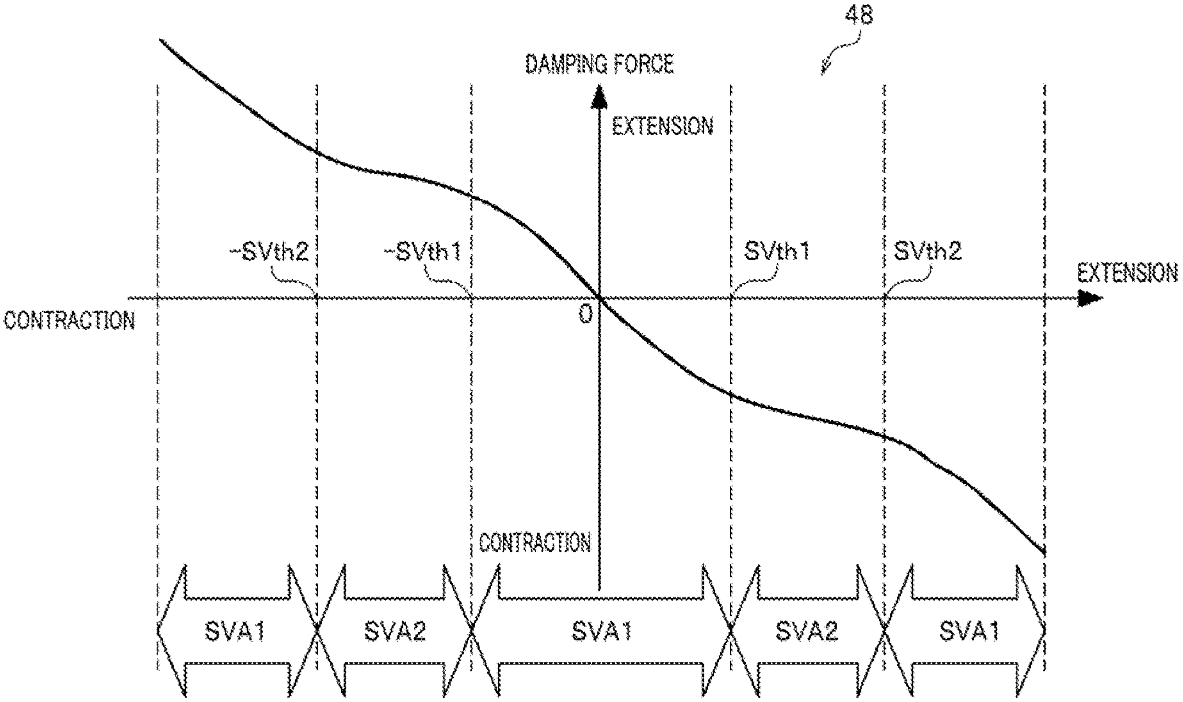
FIG. 4C explains a damping force map according to a modification.
Figure 4D:
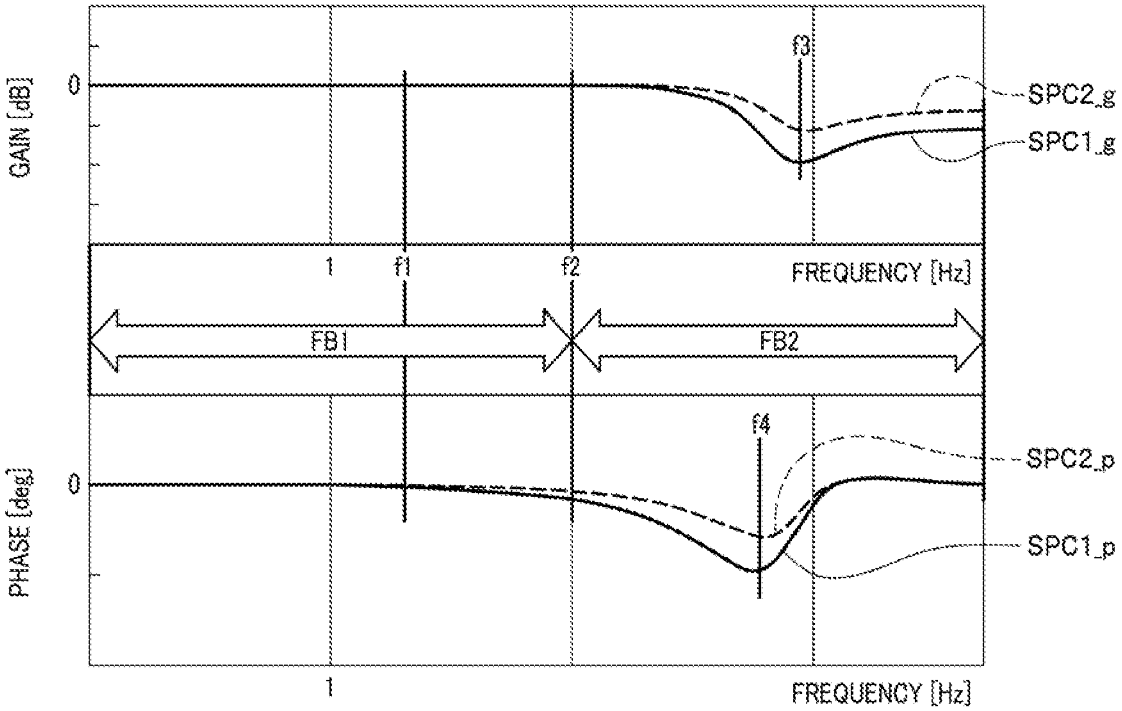
FIG. 4D explains filtering characteristics according to the embodiment, which are applied to the information on the stroke velocity for the purpose of performing a vibration damping operation suitable for the stroke velocity.
Figure 4E:
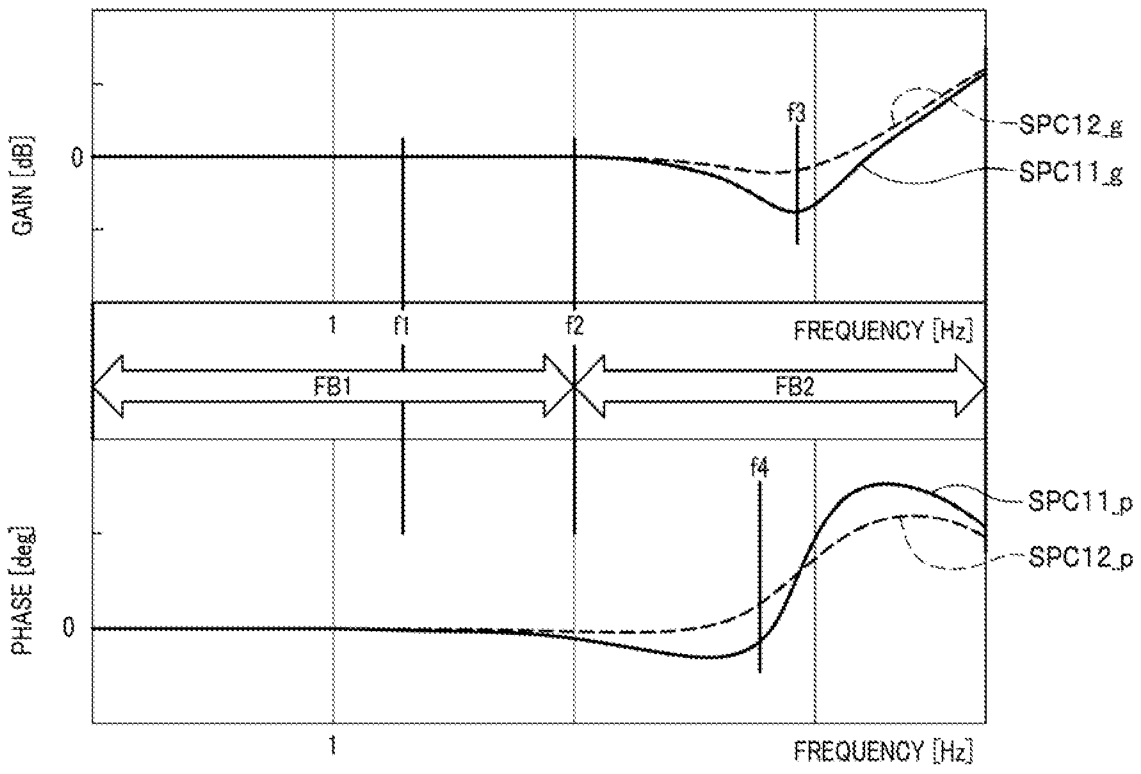
FIG. 4E explains filtering characteristics according to the modification.

Next, an internal configuration of the ECU 15 equipped in the electrically powered suspension system 11 according to the embodiment will be described with reference to FIGS. 4A to 4E. FIG. 4A is a diagram conceptually illustrating an internal configuration of the ECU 15 equipped in the electrically powered suspension system 11. FIG. 4B explains a damping force map 46 representing the relationship between information on a stroke velocity SV and a damping force, which damping force map is used in calculating a damping force suitable for a stroke velocity SV. FIG. 4C explains a damping force map 48 according to a modification. FIG. 4D explains filtering characteristics (gain characteristic and phase characteristic) according to the embodiment, which are applied to the information on the stroke velocity SV for the purpose of performing a vibration damping operation suitable for the stroke velocity SV. FIG. 4E explains filtering characteristics (gain characteristic and phase characteristic) according to the modification.

The ECU 15 equipped in the electrically powered suspension system 11 according to the embodiment includes the information acquisition unit 42. As seen in FIG. 4A, the information acquisition unit 42 acquires information on the stroke velocity SV, and sends the acquired information on the stroke velocity SV to the storage unit 44 and the filter processing unit 45.

As seen in FIG. 4A, the storage unit 44 stores a characteristic information selection map 43 to select characteristic information having a filtering characteristic (gain characteristic and phase characteristic) suitable for a stroke velocity SV changing from time to time.

The characteristic information selection map 43 is set such that first characteristic information SPC1 (see FIG. 4D; to be described later) is selected as characteristic information having a filtering characteristic (gain characteristic and phase characteristic) directed to ensuring stability when the stroke velocity SV is in a first characteristic information selection region SVA1 (see FIG. 4B) in which the stroke velocity SV is equal to or less than a first velocity threshold value SVth1 (SV≤SVth1), and that second characteristic information SPC2 (see FIG. 4D; to be described later) is selected as characteristic information having a filtering characteristic (gain characteristic and phase characteristic) directed to ensuring responsiveness when the stroke velocity SV is in a second characteristic information selection region SVA2 (see FIG. 4B) in which the stroke velocity SV is greater than the first velocity threshold value SVth1 (SV≥SVth1).

The damping force map 46 according to the embodiment will be described with reference to FIG. 4B.

As shown in FIG. 4B, a change region of the stroke velocity SV in relation to the damping force map 46 consists of the first characteristic information selection region SVA1 and the second characteristic information selection region SVA2. The first characteristic information selection region SVA1 is a velocity region in which the stroke velocity SV is equal to or less than the first velocity threshold value SVth1

(|SV|≤|SVth1|). The first velocity threshold value SVth1 is a threshold value used for defining a normal use region of the stroke velocity SV.

Therefore, during the normal running of the vehicle, values of the stroke velocity SV mostly converge to the first characteristic information selection region SVA1.

The first velocity threshold value SVth1 may be set to an appropriate value to reflect a balance between stability performance and responsiveness performance of the control system in which the degree of demand changes in accordance with the level of the stroke velocity SV and/or to take into account the fact that the ratio of stroke velocity SV appearing in the first characteristic information selection region SVA1 and the second characteristic information selection region SVA2 satisfies a predetermined ratio.

As seen in FIG. 4B, a damping force characteristic related to the damping force map 46 in the first characteristic information selection region SVA1 has a characteristic such that as the stroke velocity SV increases toward the extension direction, the damping force directed to the contraction direction increases substantially linearly, whereas as the stroke velocity SV increases toward the contraction direction, the damping force directed to the extension direction increases substantially linearly. This characteristic conforms to the damping characteristic of the conventionally used hydraulic damper. It should be noted that when the stroke velocity SV is zero, the corresponding damping force is also zero.

Similar to the damping force characteristic related to the damping force map 46 in the first characteristic information selection region SVA1, as seen in FIG. 4B, a damping force characteristic related to the damping force map 46 in the second characteristic information selection region SVA2 has a characteristic such that as the stroke velocity SV increases toward the extension direction, the damping force directed to the contraction direction increases substantially linearly, whereas as the stroke velocity SV increases toward the contraction direction, the damping force directed to the extension direction increases substantially linearly.

However, as seen in FIG. 4B, the damping force characteristic related to the damping force map 46 in the second characteristic information selection region SVA2 is set to have a gentle slope as compared with the slope of the damping force characteristic related to the damping force map 46 in the first characteristic information selection region SVA1.

A damping force map 48 (see FIG. 4C) according to a modification may be used in place of the damping force map 46 (see FIG. 4B) according to the embodiment.

The damping force map 46 according to the embodiment and the damping force map 48 according to the modification are common in that the second characteristic information selection region SVA2 as a change region of the stroke velocity SV is provided on each side of the first characteristic information selection region SVA1 via a positive first velocity threshold value SVth1 and a negative first velocity threshold value −SVth1.

However, the damping force map 48 according to the modification is different from the damping force map 46 according to the embodiment in that a pair of first characteristic information selection regions SVA1 are further provided on both sides of the pair of second characteristic information selection regions SVA2 via positive and negative high-stroke ends SVth2, −SVth2.

It should be noted that the damping force map 46 (see FIG. 4B) according to the embodiment and the damping force map 48 (see FIG. 4C) according to the modification are set such that the rate of change of the damping force relative to the stroke velocity SV in the first characteristic information selection region SVA1 is greater than the rate of change of the damping force relative to the stroke velocity SV in the second characteristic information selection regions SVA2.

Suppose that a damping control is performed by applying the relationship between the stroke velocity SV and the damping force as defined in the damping force map 46 according to the embodiment. In this case, in the first characteristic information selection region in which the stroke velocity SV is equal to or less than the first velocity threshold value SVth1, a damping control for enhancing the rate of change of the damping force relative to the stroke velocity SV is performed.

On the contrary, in the second characteristic information selection region in which the stroke velocity SV is greater than the first velocity threshold value SVth1, a damping control for suppressing the rate of change of the damping force relative to the stroke velocity SV is performed.

As a result, if the damping control for enhancing the rate of change of the damping force relative to the stroke velocity SV is performed, the system may go into a vibration state as a result of poor stability of the system control. In contrast, if the damping control for suppressing the rate of change of the damping force relative to the stroke velocity SV is performed, vibration of the vehicle 10 generated near a predetermined resonance point (see, for example, second frequency f2, third frequency f3, and fourth frequency f4 shown in FIG. 4D) is not sufficiently suppressed as a result of poor responsiveness of the system control.

For this reason, the electrically powered suspension system 11 according to the embodiment (hereinafter simply referred to as a “system” for short) is configured such that in the first characteristic information selection region in which the damping control for enhancing the rate of change of the damping force relative to the stroke velocity SV is performed, the first characteristic information SPC1 having a filtering characteristic (gain characteristic and phase characteristic) directed to ensuring the stability of the system control is applied as characteristic information associated with the information on the stroke velocity SV.

In other words, the electrically powered suspension system 11 according to this embodiment is configured such that before calculating the target damping force based on the stroke velocity SV and the damping force map 46, it properly corrects the information on the stroke velocity SV using the filtering characteristic (gain characteristic and phase characteristic) directed to ensuring the stability of the system control, which filtering characteristic is suitable for the stroke velocity SV at that time.

Further, the electrically powered suspension system 11 according to this embodiment is configured such that in the second characteristic information selection region (where the stroke velocity SV is greater than the first velocity threshold value SVth1) in which the damping control for suppressing the rate of change of the damping force relative to the stroke velocity SV is performed, the second characteristic information SPC2 having a filtering characteristic (gain characteristic and phase characteristic) directed to ensuring the responsiveness of the system control is applied as characteristic information associated with the information on the stroke velocity SV.

In other words, the electrically powered suspension system 11 according to this embodiment is configured such that before calculating the target damping force based on the stroke velocity SV and the damping force map 46, it properly corrects the information on the stroke velocity SV using the filtering characteristic (gain characteristic and phase characteristic) directed to ensuring the responsiveness of the system control, which filtering characteristic is suitable for the stroke velocity SV (or the change rate data that is information on the rate of change of the target damping force relative to a change in the stroke velocity SV) at that time.

The plurality of characteristic information SPC1, SPC2 each having a filtering characteristic (gain characteristic and phase characteristic) set in the gain-phase compensation filter 51 will be described below with reference to FIG. 4D.

As seen in FIG. 4D, the filtering characteristic according to this embodiment has a gain characteristic and a phase characteristic in which a gain and a phase change in accordance with a change in a frequency.

As shown in FIG. 4D, the change region of the frequency in the filtering characteristics according to this embodiment consists of a first frequency region FB1 and a second frequency region FB2.

The second frequency region FB2 has a frequency (e.g., about 10-500 Hz) higher than that of the first frequency region FB1 (e.g., equal to or lower than 10 Hz) containing a sprung resonance frequency f1 and an unsprung resonance frequency f2. In other words, the frequency in the second frequency region FB2 is higher than that in first frequency region FB1.

Although not limited to a specific frequency, for the sake of convenience, the boundary between the first frequency region FB1 and the second frequency region FB2 is set to the unsprung resonance frequency f2 according to this embodiment.

As shown in FIG. 4D, the plural pieces of characteristic information each having a filtering characteristic include a first characteristic information SPC1 and a second characteristic information SPC2. The first characteristic information SPC1 has a stability-oriented filtering characteristic, and consists of a first gain characteristic SPC1_*g* and a first phase characteristic SPC1_*p*. The first gain characteristic SPC1_*g* and the first phase characteristic SPC1_*p* are collectively referred to as a "first characteristic information SPC1".

The second characteristic information SPC2 has a responsiveness-oriented filtering characteristic, and consists of a second gain characteristic SPC2_*g* and a second phase characteristic SPC2_*p*. The second gain characteristic SPC2_*g* and the second phase characteristic SPC2_*p* are collectively referred to as a "second characteristic information SPC2".

Next, the first characteristic information SPC1 and the second characteristic information SPC2 will be described below.

As seen in FIG. 4D, the first characteristic information SPC1 has the first gain characteristic SPC1_*g* and the first phase characteristic SPC1_*p*. The first characteristic information SPC1 extends over the first frequency region FB1 and the second frequency region FB2. The first frequency region FB1 contains the sprung resonance frequency f1 (generally about 1-2 Hz) and the unsprung resonance frequency f2 (generally about 10-13 Hz). The second frequency region FB2 has a frequency higher than that of the first frequency region FB1.

As shown in FIG. 4D, the first gain characteristic SPC1_*g* of the first characteristic information SPC1 shows a characteristic to converge substantially to 0 (zero) dB or around 0 dB, whereas the first phase characteristic SPC1_*p* shows a characteristic to converge substantially to 0 (zero) deg or around 0 deg (characteristic with a small amount of phase shift).

Further, in the first characteristic information SPC1, the gain in the second frequency region FB2 is generally lower than the gain in the first frequency region FB1. Similarly, the phase in the second frequency region FB2 is generally delayed from the phase in the first frequency region FB1.

On the contrary, as seen in FIG. 4D, the second characteristic information SPC2 has the second gain characteristic SPC2_*g* and the second phase characteristic SPC2_*p*. The second characteristic information SPC2 extends over the first frequency region FB1 and the second frequency region FB2.

As shown in FIG. 4D, the second gain characteristic SPC2_*g* of the second characteristic information SPC2 shows a characteristic to converge substantially to 0 (zero) dB or around 0 dB, whereas the second phase characteristic SPC2_*p* shows a characteristic to converge substantially to 0 (zero) deg or around 0 deg.

Further, in the second characteristic information SPC2, the gain in the second frequency region FB2 is generally lower than the gain in the first frequency region FB1. Similarly, the phase in the second frequency region FB2 is generally delayed from the phase in the first frequency region FB1.

In the following description, the first characteristic information SPC1 and the second characteristic information SPC2 are collectively referred to as a "plurality of filtering characteristics SPC" for short.

In the plurality of filtering characteristics SPC (first characteristic information SPC1 and second characteristic information SPC2), the gain characteristic in the second frequency region FB2 is set, for example, to have a stroke-velocity-responsive-type characteristic in which as the stroke velocity SV increases, the gain increase accordingly. Further, the phase characteristic in the second frequency region FB2 is set to have a stroke-velocity-responsive-type characteristic in which as the stroke velocity SV increases, the amount of phase shift decreases (advancing in the phase) accordingly.

To be more specific, as seen in FIG. 4D, the electrically powered suspension system 11 according to this embodiment is configured such that with respect to the first characteristic information SPC1 and the second characteristic information SPC2, the gain characteristic (first gain characteristic SPC1_*g*) at a third frequency f3 (f1<f2<f3: for example, f3 is about 40-100 Hz) in the second frequency region FB2 is set to have a characteristic (second gain characteristic SPC2_*g*) in which the gain increases when the stroke velocity SV exceeds the first velocity threshold value SVth1. The third frequency f3 may be set as a frequency near the lowermost gain among the gain characteristics of the first characteristic information SPC1 and the second characteristic information SPC2.

Further, as seen in FIG. 4D, the electrically powered suspension system 11 according to this embodiment is configured such that with respect to the first characteristic information SPC1 and the second characteristic information SPC2, the phase characteristic (first phase characteristic SPC1_*p*) at a fourth frequency f4 (f1<f2<f4: for example, f4 is about 40-100 Hz) in the second frequency region FB2 is set to have a characteristic (second phase characteristic SPC2_*p*) in which the amount of phase shift decreases (advancing in the phase) when the stroke velocity SV exceeds the first velocity threshold value SVth1. The fourth frequency f4 may be set as a frequency near the largest amount of phase shift among the phase characteristics of the first characteristic information SPC1 and the second characteristic information SPC2.

As described above, it is assumed that in the electrically powered suspension system (system) 11 according to this embodiment, a resonance points is present near the third frequency f3 and the fourth frequency f4 in the second frequency region FB2.

To be more specific, a resonance point of the system according to this embodiment is resulting from the moment of inertia of the electromagnetic actuator 13 and the rotational rigidity of the belt member 35. The resonance frequency thereof is about 40-100 Hz, and is present in the second frequency region FB2 in which the frequency (e.g., about 10-500 Hz) is higher than the frequency (e.g., 10 Hz or lower) in the first frequency region FB1 containing the sprung resonance frequency f1 and the unsprung resonance frequency f2.

Next, a plural pieces of characteristic information SPC11, SPC12 set in the gain-phase compensation filter 51 and having a filtering characteristic (gain characteristic and phase characteristic) according to a modification will be described below with reference to FIG. 4E.

As shown in FIG. 4E, the filtering characteristic according to the modification has a gain characteristic and a phase characteristic in which the gain and the phase change in accordance with a change in the frequency.

Similar to the filtering characteristic according to the embodiment, as seen in FIG. 4E, the change region of the frequency in the filtering characteristics according to the modification consists of a first frequency region FB1 and a second frequency region FB2.

As shown in FIG. 4E, the plural pieces of characteristic information each having a filtering characteristic according to the modification include an 11th characteristic information SPC11 and a 12th characteristic information SPC12. The 11th characteristic information SPC11 has a stability-oriented filtering characteristic, and consists of an 11th gain characteristic SPC11_*g* and an 11th phase characteristic SPC11_*p*. The 11th gain characteristic SPC11_*g* and the 11th phase characteristic SPC11_*p* are collectively referred to as an “11th characteristic information SPC11”. The 11th characteristic information SPC11 according to the modification serves as a “first characteristic information” according to the present invention.

The 12th characteristic information SPC12 has a responsiveness-oriented filtering characteristic, and consists of a 12th gain characteristic SPC12_*g* and a 12th phase characteristic SPC12_*p*. The 12th gain characteristic SPC12_*g* and the 12th phase characteristic SPC12_*p* are collectively referred to as a “12th characteristic information SPC12”. The 12th characteristic information SPC12 according to the modification serves as a “second characteristic information” according to the present invention.

Next, the 11th characteristic information SPC11 and the 12th characteristic information SPC12 will be described below.

As seen in FIG. 4E, the 11th characteristic information SPC11 has the 11th gain characteristic SPC11_*g* and the 11th phase characteristic SPC11_*p*. The 11th characteristic information SPC11 extends over the first frequency region FB1 and the second frequency region FB2.

On the contrary, as seen in FIG. 4E, the 12th characteristic information SPC12 has the 12th gain characteristic SPC12_*g* and the 12th phase characteristic SPC12_*p*. The 12th characteristic information SPC12 extends over the first frequency region FB1 and the second frequency region FB2.

With reference to FIGS. 4D and 4E, the 11th characteristic information SPC11 and the 12th characteristic information SPC12 having filtering characteristics according to the modification will be described in contradistinction to the first characteristic information SPC1 and the second characteristic information SPC2 having filtering characteristics according to the embodiment will be described below.

As compared to the first characteristic information SPC1 and the second characteristic information SPC2 having filtering characteristics according to the embodiment, the 11th characteristic information SPC11 and the 12th characteristic information SPC12 having filtering characteristics according to the modification have a tendency that the gain increases and the phase advances in the frequency region exceeding the third frequency f3 in the second frequency region FB2.

The reason why the 11th characteristic information SPC11 and the 12th characteristic information SPC12 having filtering characteristics according to the modification are disclosed is that the improvement in the stability of the system control (based on an extra margin of the gain and an extra margin of the phase) and the responsiveness of the system control can be adjusted, for example (although not limited), by adopting characteristics that the gain increases and the phase advances (in contrast to the filtering characteristics according to the embodiment) in the frequency region exceeding the third frequency f3 in the second frequency region FB2.

<Operation of the Electrically Powered Suspension System 11 According to this Embodiment>

Figure 5:
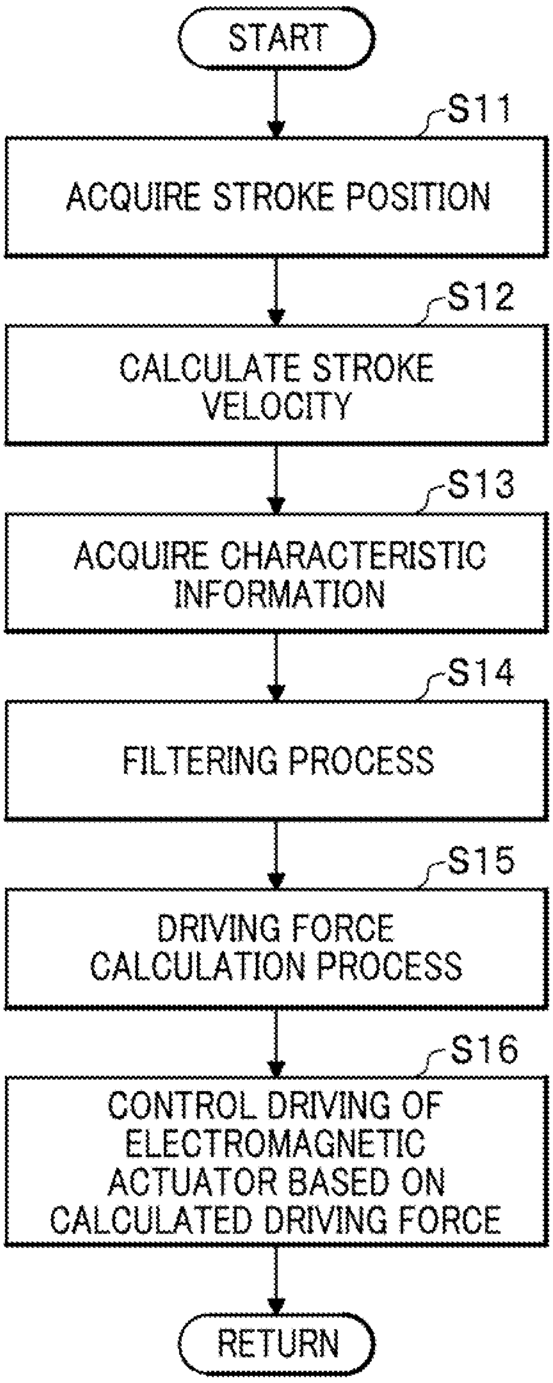
FIG. 5 is a flowchart for explaining an operation of the electrically powered suspension system.

Next, the operation of the electrically powered suspension system 11 according to the embodiment will be described with reference to FIG. 5. FIG. 5 is a flowchart for explaining an operation of the electrically powered suspension system 11 according to the embodiment.

In step S11 (stroke position acquisition) shown in FIG. 5, the information acquisition unit 42 of the ECU 15 acquires a rotation angle signal of the electric motor 31 detected by the resolver 37 as information on the stroke position.

In step S12 (stroke velocity calculation), the information acquisition unit 42 of the ECU 15 calculates the stroke velocity SV by time-differentiating the information on the stroke position acquired in step S11. The information on the stroke velocity SV calculated in this way is sent to the storage unit 44 and the filter processing unit 45.

In step S13 (characteristic information acquisition), the ECU selectively acquires the characteristic information having a filtering characteristic (gain characteristic and phase characteristic) suitable for the stroke velocity SV at this point of time, based on the information on the stroke velocity SV acquired in step S12 and the characteristic information selection map 43.

In step S14 (filtering process), the filter processing unit 45 of the ECU 15 performs a filtering process to apply to a time-series signal of the stroke velocity SV calculated (acquired) in step S12 the filtering characteristic (gain characteristic and phase characteristic) related to the characteristic information acquired in step S13, and then outputs the filtered stroke velocity signal in which the gain and the phase have been corrected to the frequency characteristic suitable for the stroke velocity SV at that time. The filtered stroke velocity signal processed by the filter processing unit 45 is sent to the driving force calculation unit 47.

In step S15 (driving force calculation process), after receiving the filtered stroke velocity signal processed in step S14, the driving force calculation unit 47 of the ECU 15 calculates and obtains the target damping force with reference to the filtered stroke velocity signal and the damping force map 46, and calculates the drive control signal for providing the target damping force.

In step S16, the drive control unit 49 of the ECU 15 controls driving of the plurality of electromagnetic actuators 13 by supplying drive control power to the electric motor 31 provided in each of the plurality of electromagnetic actuators 13 in accordance with the drive control signal obtained by the calculation of step S15.

<Operation and Effects of the Electrically Powered Suspension System 11 According to the Embodiment and Modification>

The applicant of the present invention has proposed an electrically powered suspension system in Japanese Patent No. 6417443 (corresponding to U.S. patent application Ser. No. 15/954018), the disclosures of all of which are incorporated by reference in their entirety herein.

The operation and advantageous effects of the electrically powered suspension system 11 according to the embodiment and the modification will be described below in contradistinction to the electrically powered suspension system disclosed in the above Japanese Patent.

According to the electrically powered suspension system disclosed in the Japanese Patent, it is possible to prevent the vehicle from going into full-bump or full-rebound in an extreme driving situation and to provide ride comfort and steering stability of the vehicle.

In order to further improve the ride comfort and the steering stability, the electrically powered suspension system 11 according to the embodiment aims to suppress vibration when vibration is input to the electromagnetic actuator, while satisfying stability and responsiveness of the system control. For this reason, the following points are considered in the electrically powered suspension systems 11 according to the embodiment and the modification.

When the vehicle travels on a road surface while receiving a road surface input having a relatively small stroke velocity SV, it is required that vibration on the vehicle body and the wheels be suppressed by generating a damping force having a responsiveness corresponding to a gradual change in the stroke velocity SV. To this end, it is required for the electrically powered suspension system 11 to set the change rate of the damping force relative to the stroke velocity SV to a higher rate. In other words, it is required to set the control gain of the damping force to a higher value.

Suppose that the control gain of the damping force is set to a higher value in the electrically powered suspension system 11. In this instance, it is assumed that a filtering characteristic directed to ensuring stability of the system control may be applied to the stroke velocity SV in order to prevent the system from going into a vibration state as a result of poor stability of the system control. This may result in insufficient responsiveness of the damping force.

As a result, when the vehicle travels on a road surface while receiving a road surface input having a relatively large stroke velocity SV, the damping force performance near the resonance point of the system is insufficient. This may impair ride comfort of the vehicle 10 because vibration of the vehicle 10 generated near the resonance point of the system is not sufficiently suppressed.

Meanwhile, when the vehicle travels on a road surface while receiving a road surface input having a relatively large stroke velocity SV, the ride comfort of the vehicle 10 is impaired if an excessively large damping force is generated in response to a sharp change in the stroke velocity SV. With this in view, it is required for the electrically powered suspension system 11 to set the change rate of the damping force relative to the stroke velocity SV to a lower rate. In other words, it is required to set the control gain of the damping force to a lower value.

Suppose that the control gain of the damping force is set to a lower value in the electrically powered suspension system 11. In this instance, it is assumed that a filtering characteristic directed to ensuring responsiveness of the system control may be applied to the stroke velocity SV in order to prevent the situation in which vibration of the vehicle 10 cannot be suppressed sufficiently due to insufficient damping force performance near the resonance point of the system. This may result in insufficient stability of the system control.

As a result, when the vehicle travels on a road surface while receiving a road surface input having a relatively small stroke velocity SV, the system may go into a vibration state as a result of poor stability of the system control. This may impair ride comfort of the vehicle 10 because vibration of the vehicle 10 is not sufficiently suppressed.

For this reason, the electrically powered suspension system 11 according to the embodiment is configured to previously prevent the system from going into a vibration state as a result of poor stability of the system control as well as to suppress vibration of the vehicle 10 generated near the resonance point of the system, when setting the characteristic of the damping force required for the system.

The electrically powered suspension system 11 according to the first aspect includes: the electromagnetic actuator 13 disposed between the vehicle body and a wheel of the vehicle 10 and configured to generate a driving force related to vibration damping of the vehicle 10; the information acquisition unit 42 configured to acquire information on the stroke velocity SV of the electromagnetic actuator 13; the driving force calculation unit 47 (target damping force calculation unit) configured to calculate the target damping force that is the target value for the damping operation of the electromagnetic actuator 13 based on the stroke velocity SV; the drive control unit 49 configured to control driving of the electromagnetic actuator 13 based on the target damping force; and the filter processing unit 45 configured to perform a filtering process by applying a predetermined filtering characteristic to the stroke velocity SV.

The filter processing unit 45 has a plurality of filtering characteristics set in the second frequency region FB2, which has a frequency higher than that of the first frequency region FB1 containing the sprung resonance frequency f1 and the unsprung resonance frequency f2, and the filter processing unit 45 selectively applies, among the plurality of filtering characteristics, one filtering characteristic that is based on the stroke velocity SV to the stroke velocity.

The filter processing unit 45 of the electrically powered suspension system 11 according to the first aspect performs a filtering process to selectively apply, among the plurality of filtering characteristics set in the second frequency region FB2 in which the frequency is higher than the frequency in the first frequency region FB1 containing the sprung resonance frequency f1 and the unsprung resonance frequency f2, one filtering characteristic that is based on the stroke velocity SV (suitable for the stroke velocity SV) to the stroke velocity SV.

The filter processing unit 45 of the electrically powered suspension system 11 according to the first aspect properly corrects the stroke velocity SV using the filtering characteristic suitable for the stroke velocity SV at that time. Therefore, even if vibration is input to the electromagnetic actuator 13, the electrically powered suspension system 11 can sufficiently suppress vibration of the vehicle 10 while satisfying stability and responsiveness of the system control and avoiding the system going into a vibration state.

Further, when setting the characteristic of the damping force required for the system, the electrically powered suspension system 11 according to the first aspect can prevent the system from going into a vibration state as a result of poor stability of the system control and suppress vibration of the vehicle 10 generated near the resonance point of the system.

The electrically powered suspension system 11 according to a second aspect includes the electromagnetic actuator 13, the information acquisition unit 42, the driving force calculation unit 47 (target damping force calculation unit), the drive control unit 49, and the filter processing unit 45 configured to perform a filtering process by applying a predetermined filtering characteristic to the stroke velocity SV.

The filter processing unit 45 has a plurality of filtering characteristics set in the second frequency region FB2, which has a frequency higher than that of the first frequency region FB1 containing the sprung resonance frequency f1 and the unsprung resonance frequency f2, and the filter processing unit 45 selectively applies, among the plurality of filtering characteristics, one filtering characteristic that is based on the rate of change of the target damping force relative to the stroke velocity SV to the stroke velocity SV.

The filter processing unit 45 of the electrically powered suspension system 11 according to the second aspect performs a filtering process to selectively apply, among the plurality of filtering characteristics set in the second frequency region FB2 in which the frequency is higher than the frequency in the first frequency region FB1 containing the sprung resonance frequency f1 and the unsprung resonance frequency f2, one filtering characteristic that is based on the rate of change of the target damping force relative to the stroke velocity SV (suitable for the stroke velocity SV) to the stroke velocity SV.

The filter processing unit 45 of the electrically powered suspension system 11 according to the second aspect properly corrects the stroke velocity SV using the filtering characteristic that is based on the rate of change of the target damping force relative to the stroke velocity SV at that time and suitable for the stroke velocity SV. Therefore, even if vibration is input to the electromagnetic actuator 13, the electrically powered suspension system 11 can sufficiently suppress vibration of the vehicle 10 while satisfying stability and responsiveness of the system control and avoiding the system going into a vibration state.

Further, when setting the characteristic of the damping force required for the system, the electrically powered suspension system 11 according to the second aspect can suppress vibration of the vehicle 10 generated near the resonance point of the system and prevent the system from going into a vibration state as a result of poor stability of the system control.

The electrically powered suspension system 11 according to the third aspect includes: the electromagnetic actuator 13 disposed between the vehicle body and a wheel of the vehicle 10 and configured to generate a driving force related to vibration damping of the vehicle 10; the information acquisition unit 42 configured to acquire information on the stroke velocity SV of the electromagnetic actuator 13; the characteristic information storage unit (storage unit) 44 configured to store, in association with the magnitude of the stroke velocity SV, the plural pieces of characteristic information SPC1, SPC2 each having a specific filtering characteristic to be applied to the information on the stroke velocity SV; the filter processing unit 45 configured to acquire characteristic information having a specific filtering characteristic suitable for the stroke velocity SV based on the stroke velocity SV and the storage content of the characteristic information storage unit 44, and to apply the filtering process to the information on the stroke velocity SV acquired by the information acquisition unit 42 by applying a filtering process related to the acquired characteristic information; and the drive control unit 49 configured to calculate the target damping force that is the target value for the damping operation of the electromagnetic actuator 13 based on the stroke velocity SV having filter processed by the filter processing unit 45 and the information on the relationship between the thus filter processed stroke velocity SV and the damping force, and to control driving of the electromagnetic actuator 13 based on the calculated target damping force.

The plural pieces of characteristic information SPC1, SPC2 are set in the second frequency region FB2, which has a frequency higher than that of the first frequency region FB1 containing the sprung resonance frequency f1 and the unsprung resonance frequency f2, such that each characteristic information has a specific filtering characteristic.

The characteristic information storage unit 44 of the electrically powered suspension system 11 according to the third aspect stores, in association with the magnitude of the stroke velocity SV, the plural pieces of characteristic information SPC1, SPC2 each having a filtering characteristic to be applied to the information on the stroke velocity SV. The filter processing unit 45 acquires characteristic information having a specific filtering characteristic suitable for the stroke velocity SV based on the stroke velocity SV acquired by the information acquisition unit 42 and the storage content of the characteristic information storage unit 44, and then apply the filtering process to the information on the stroke velocity SV acquired by the information acquisition unit 42 by applying a filtering process related to the acquired characteristic information. The drive control unit 49 calculates the target damping force that is the target value for the damping operation of the electromagnetic actuator 13 based on the stroke velocity SV having filter processed by the filter processing unit 45 and the information on the relationship between the thus filter processed stroke velocity SV and the damping force, and then controls driving of the electromagnetic actuator 13 based on the calculated target damping force.

The plural pieces of characteristic information SPC1, SPC2 are set in the second frequency region FB2, which has a frequency higher than that of the first frequency region FB1 containing the sprung resonance frequency f1 and the unsprung resonance frequency f2, such that each characteristic information has a specific filtering characteristic.

The filter processing unit 45 of the electrically powered suspension system 11 according to the third aspect properly corrects the information on the stroke velocity SV, before calculating the target damping force based on the information on the relationship between the stroke velocity SV and the damping force, using the filtering characteristic which is suitable for the stroke velocity SV at that time and in which the stability or the responsiveness of the system control is reflected. Therefore, even if vibration is input to the electromagnetic actuator 13, the electrically powered suspension system 11 can sufficiently suppress vibration of the vehicle 10 while satisfying stability and responsiveness of the system control and avoiding the system going into a vibration state.

Further, when setting the characteristic of the damping force required for the system, the electrically powered suspension system 11 according to the third aspect can suppress vibration of the vehicle 10 generated near the resonance point of the system and prevent the system from going into a vibration state as a result of poor stability of the system control.

The electrically powered suspension system 11 according to the fourth aspect includes: the electromagnetic actuator 13 disposed between the vehicle body and a wheel of the vehicle 10 and configured to generate a driving force related to vibration damping of the vehicle 10; the information acquisition unit 42 configured to acquire information on the stroke velocity SV of the electromagnetic actuator 13; the change rate information storage unit (storage unit) 44 configured to store, in association with the magnitude of the stroke velocity SV, the change rate data that is information on the rate of change of the target damping force relative to a change in the stroke velocity SV; the characteristic information storage unit (storage unit) 44 configured to store, in association with the change rate data based on the stroke velocity SV, the plural pieces of characteristic information SPC1, SPC2 each having a specific filtering characteristic to be applied to the information on the stroke velocity SV; the filter processing unit 45 configured to acquire characteristic information having a specific filtering characteristic suitable for the change rate data, based on the change rate data on the basis of the stroke velocity SV and based on the storage content of the characteristic information storage unit 44, and to apply a filtering process to the information on the stroke velocity SV acquired by the information acquisition unit 42 by applying a filtering process related to the acquired characteristic information; the drive control unit 49 configured to calculate the target damping force that is the target value for the damping operation of the electromagnetic actuator 13 based on the stroke velocity SV having filter processed by the filter processing unit 45 and the information on the relationship between the thus filter processed stroke velocity SV and the damping force, and to control driving of the electromagnetic actuator 13 based on the calculated target damping force.

The plural pieces of characteristic information SPC1, SPC2 are set in the second frequency region FB2, which has a frequency higher than that of the first frequency region FB1 containing the sprung resonance frequency f1 and the unsprung resonance frequency f2, such that each characteristic information has a specific filtering characteristic.

The change rate information storage unit (storage unit) 44 of the electrically powered suspension system 11 according to the fourth aspect stores, in association with the magnitude of the stroke velocity SV, the change rate data that is information on the rate of change of the target damping force relative to a change in the stroke velocity SV. The characteristic information storage unit (storage unit) 44 of the electrically powered suspension system 11 according to the fourth aspect stores, in association with the magnitude of the stroke velocity SV, the plural pieces of characteristic information SPC1, SPC2 each having a filtering characteristic to be applied to the information on the stroke velocity SV.

The filter processing unit 45 acquires characteristic information having a specific filtering characteristic suitable for the change rate data, based on the change rate data on the basis of the stroke velocity SV and based on the storage content of the characteristic information storage unit 440, and to apply a filtering process to the information on the stroke velocity SV acquired by the information acquisition unit 42 by applying a filtering process related to the acquired characteristic information.

The drive control unit 49 calculates the target damping force that is the target value for the damping operation of the electromagnetic actuator 13 based on the stroke velocity SV having filter processed by the filter processing unit 45 and the information on the relationship between the thus filter processed stroke velocity SV and the damping force, and then controls driving of the electromagnetic actuator 13 based on the calculated target damping force.

The plural pieces of characteristic information SPC1, SPC2 are set in the second frequency region FB2, which has a frequency higher than that of the first frequency region FB1 containing the sprung resonance frequency f1 and the unsprung resonance frequency f2, such that each characteristic information has a specific filtering characteristic.

The filter processing unit 45 of the electrically powered suspension system 11 according to the fourth aspect properly corrects the information on the stroke velocity SV, before calculating the target damping force based on the information on the relationship between the stroke velocity SV and the damping force, using the filtering characteristic which is suitable for the change rate data that is the information on the rate of change of the target damping force relative to the stroke velocity SV at that time and in which the stability and the responsiveness of the system control are reflected. Therefore, as with the electrically powered suspension system 11 according to the first aspect, even if vibration is input to the electromagnetic actuator 13, the electrically powered suspension system 11 can sufficiently suppress vibration of the vehicle 10 while satisfying stability and responsiveness of the system control and avoiding the system going into a vibration state.

Further, when setting the characteristic of the damping force required for the system, the electrically powered suspension system 11 according to the fourth aspect can suppress vibration of the vehicle 10 generated near the resonance point of the system and prevent the system from going into a vibration state as a result of poor stability of the system control.

Further, the electrically powered suspension system 11 according to the fifth aspect is configured, in addition to the aspect of the electrically powered suspension system 11 according to the third aspect or the fourth aspect, such that the plural pieces of characteristic information SPC1, SPC 2 are set to have specific gain characteristics as specific filtering characteristics to be applied to the information on the stroke velocity SV.

The filter processing unit 45 of the electrically powered suspension system 11 according to the fifth aspect properly corrects the information on the stroke velocity SV, before calculating the target damping force based on the information on the relationship between the stroke velocity SV and the damping force, using the gain characteristic which is suitable for the stroke velocity SV at that time and in which the stability or the responsiveness of the system control is reflected. Therefore, as with the electrically powered suspension system 11 according to the first aspect or the second aspect, even if vibration is input to the electromagnetic actuator 13, the electrically powered suspension system 11 can sufficiently suppress vibration of the vehicle 10 while satisfying stability and responsiveness of the system control and avoiding the system going into a vibration state.

Further, when setting the characteristic of the damping force required for the system, the electrically powered suspension system 11 according to the fifth aspect can suppress vibration of the vehicle 10 generated near the resonance point of the system and prevent the system from going into a vibration state as a result of poor stability of the system control.

The electrically powered suspension system 11 according to the sixth aspect is configured, in addition to the aspect of the electrically powered suspension system 11 according to the third aspect or the fourth aspect, such that the plural pieces of characteristic information SPC1, SPC2 are set to have specific phase characteristics as specific filtering characteristics to be applied to the information on the stroke velocity SV.

The filter processing unit 45 of the electrically powered suspension system 11 according to the sixth aspect properly corrects the information on the stroke velocity SV, before calculating the target damping force based on the information on the relationship between the stroke velocity SV and the damping force, using the phase characteristic which is suitable for the stroke velocity SV at that time and in which the stability or the responsiveness of the system control is reflected. Therefore, as with the electrically powered suspension system 11 according to the first aspect or the second aspect, even if vibration is input to the electromagnetic actuator 13, the electrically powered suspension system 11 can sufficiently suppress vibration of the vehicle 10 while satisfying stability and responsiveness of the system control and avoiding the system going into a vibration state.

Further, when setting the characteristic of the damping force required for the system, the electrically powered suspension system 11 according to the sixth aspect can suppress vibration of the vehicle 10 generated near the resonance point of the system and prevent the system from going into a vibration state as a result of poor stability of the system control.

The electrically powered suspension system 11 according to the seventh aspect is configured, in addition to the aspect of the electrically powered suspension system 11 according to the third aspect or the fourth aspect, such that the plural pieces of characteristic information SPC1, SPC2 are set to have specific gain characteristics and specific phase characteristics as specific filtering characteristics to be applied to the information on the stroke velocity SV.

The filter processing unit 45 of the electrically powered suspension system 11 according to the seventh aspect properly corrects the information on the stroke velocity SV, before calculating the target damping force based on the information on the relationship between the stroke velocity SV and the damping force, using the gain characteristic and the phase characteristic which are suitable for the stroke velocity SV at that time and in which the stability or the responsiveness of the system control is reflected. Therefore, as with the electrically powered suspension system 11 according to the first aspect or the second aspect, even if vibration is input to the electromagnetic actuator 13, the electrically powered suspension system 11 can sufficiently suppress vibration of the vehicle 10 while satisfying stability and responsiveness of the system control and avoiding the system going into a vibration state.

Further, when setting the characteristic of the damping force required for the system, the electrically powered suspension system 11 according to the seventh aspect can suppress vibration of the vehicle 10 generated near the resonance point of the system and prevent the system from going into a vibration state as a result of poor stability of the system control.

The electrically powered suspension system 11 according to the eighth aspect may be configured, in addition to the aspect of the electrically powered suspension system 11 according to the seventh aspect, such that the plural pieces of characteristic information SPC1, SPC2 includes the first characteristic information SPC1 having a gain characteristic and a phase characteristic directed to ensuring stability of the system control, and the second characteristic information SPC2 having a gain characteristic and a phase characteristic directed to ensuring responsiveness of the system control.

The first characteristic information SPC1 is used when the stroke velocity SV acquired by the information acquisition unit 42 is equal to or less than a predetermined velocity threshold value (i.e., first velocity threshold value SVth1), that is, the rate of change of the target damping force relative to the stroke velocity SV is relatively large. The second characteristic information SPC2 is used when the stroke velocity SV acquired by the information acquisition unit 42 is greater than the predetermined velocity threshold value (i.e., first velocity threshold value SVth1), that is, the rate of change of the target damping force relative to the stroke velocity SV is relatively small.

The electrically powered suspension system 11 according to the eighth aspect applies to the information on the stroke velocity SV the first characteristic information SPC1 having a gain characteristic and a phase characteristic directed to ensuring stability of the system control, at the time of performing the damping control for enhancing the rate of change of the damping force relative to the stroke velocity SV, that is, when the stroke velocity SV is equal to or less than the first velocity threshold value SVth1.

On the other hand, the electrically powered suspension system 11 according to the eighth aspect applies to the information on the stroke velocity SV the second characteristic information SPC2 having a gain characteristic and a phase characteristic directed to ensuring responsiveness of the system control, at the time of performing the damping control for suppressing the rate of change of the damping force relative to the stroke velocity SV, that is, when the stroke velocity SV is greater than the first velocity threshold value SVth1.

The electrically powered suspension system 11 according to the eighth aspect properly corrects the information on the stroke velocity SV, before calculating the target damping force based on the information on the relationship between the stroke velocity SV and the damping force, using, where appropriate, the characteristic information having a gain characteristic and a phase characteristic which are suitable for the stroke velocity SV at that time and are directed to ensuring stability of the system control or responsiveness of the system control. Therefore, even if vibration is input to the electromagnetic actuator 13, the electrically powered suspension system 11 can sufficiently suppress vibration of the vehicle 10 while satisfying stability and responsiveness of the system control and avoiding the system going into a vibration state.

Further, when setting the characteristic of the damping force required for the system, the electrically powered suspension system 11 according to the eighth aspect can suppress vibration of the vehicle 10 generated near the resonance point of the system and prevent the system from going into a vibration state as a result of poor stability of the system control.

Other Embodiments

The embodiment and the modification described above are examples of implementations of the present invention. Therefore, the technical scope of the present invention should not be construed in a limited manner by these embodiment and modification. The present invention can be implemented in various forms without departing from the gist or the main scope of the present invention.

For example, in the description of the internal configuration of the ECU 15 equipped in the electrically powered suspension system 11 according to the embodiment, the combination of the pair of first characteristic information SPC1 and second characteristic information SPC2 has been exemplified as an example of a plural pieces of characteristic information each having a specific filtering characteristic (gain characteristic and phase characteristic) to be applied to the time-series information on the stroke velocity SV, which plural pieces of characteristic information are stored in the storage unit (characteristic information storage unit) 44 in advance. However, the present invention is not limited to this specific configuration.

The number (kinds) of the plural pieces of characteristic information each having a specific filtering characteristic (gain characteristic and phase characteristic) to be applied to the time-series information on the stroke velocity SV and previously stored in the storage unit (characteristic information storage unit) 44 may be set to an appropriate number (kinds) through experiments or simulations to reflect the balance between the stability performance and the responsiveness performance of the control system in which the degree of demand changes in accordance with the level of the stroke velocity SV.

Further, in the description of the electrically powered suspension system 11 according to the embodiment, the boundary between the first frequency region FB1 and the second frequency region FB2 is set to the unsprung resonance frequency f2. However, the present invention is not limited to this specific configuration.

The first frequency region FB1 and the second frequency region FB2 may be set appropriately as long as the first frequency region FB1 contains the sprung resonance frequency f1 and the unsprung resonance frequency f2 and the first frequency region FB1 and the second frequency region FB2 do not have a common frequency region.

Further, the electrically powered suspension system 11 according to the embodiment has been described such that the total of four electromagnetic actuators 13 are arranged in both the front wheels (front right wheel and front left wheel) and the rear wheels (rear right wheel and rear left wheel). However, the present invention is not limited to this specific embodiment. For example, the total of two electromagnetic actuators 13 may be arranged in either one of the front wheels and the rear wheels.

Further, the electrically powered suspension system 11 according to the embodiment has been described such that the drive control unit 49 may independently control driving of the plurality of electromagnetic actuators 13.

To be more specific, the drive control unit 49 may independently control driving of the electromagnetic actuators 13 respectively provided in the four wheels, separately for wheels.

Further, the drive control unit 49 may independently control driving of the electromagnetic actuators 13 respectively provided for the four wheels, separately for the front wheels and for the rear wheels, or separately for the left wheels and the right wheels.

What is claimed is:

1. An electrically powered suspension system comprising:

an electromagnetic actuator disposed between a vehicle body and a wheel of a vehicle and configured to generate a driving force related to vibration damping of the vehicle;

an information acquisition unit configured to acquire information on a stroke velocity of the electromagnetic actuator;

a target damping force calculation unit configured to calculate a target damping force that is a target value for a damping operation of the electromagnetic actuator based on the stroke velocity;

a drive control unit configured to control driving of the electromagnetic actuator based on the target damping force; and a filter processing unit configured to perform a filtering process by applying a predetermined filtering characteristic to the stroke velocity, wherein the filter processing unit has filtering characteristics set in a second frequency region, which has a frequency higher than that of a first frequency region containing a sprung resonance frequency and an unsprung resonance frequency, the filtering characteristics comprising a first characteristic having a predetermined gain characteristic and a predetermined phase characteristic, and a second characteristic set, when the stroke velocity exceeds a predetermined velocity threshold value, such that a gain increases and a phase advances with respect to the first characteristic, and wherein the filter processing unit selectively applies, among the filtering characteristics comprising the first characteristic and the second characteristic, one filtering characteristic that is based on the stroke velocity to the stroke velocity.

2. The electrically powered suspension system according to claim 1, wherein the second characteristic is set such that a gain characteristic in the second frequency region has a characteristic lower than the gain characteristic in the first frequency region and a phase characteristic in the second frequency region has a characteristic delayed from the phase characteristic in the first frequency region.

3. An electrically powered suspension system comprising:

an electromagnetic actuator disposed between a vehicle body and a wheel of a vehicle and configured to generate a driving force related to vibration damping of the vehicle;

an information acquisition unit configured to acquire information on a stroke velocity of the electromagnetic actuator;

a target damping force calculation unit configured to calculate a target damping force that is a target value for a damping operation of the electromagnetic actuator based on the stroke velocity;

a drive control unit configured to control driving of the electromagnetic actuator based on the target damping force; and a filter processing unit configured to perform a filtering process by applying a predetermined filtering characteristic to the stroke velocity, wherein the filter processing unit has filtering characteristics set in a second frequency region, which has a frequency higher than that of a first frequency region containing a sprung resonance frequency and an unsprung resonance frequency, the filtering characteristics comprising a first characteristic having a predetermined gain characteristic and a predetermined phase characteristic, and a second characteristic set, when the stroke velocity exceeds a predetermined velocity threshold value, such that a gain increases and a phase advances with respect to the first characteristic, and wherein the filter processing unit selectively applies, among the filtering characteristics comprising the first characteristic and the second characteristic, one filtering characteristic that is based on a rate of change of the target damping force relative to the stroke velocity to the stroke velocity.

4. The electrically powered suspension system according to claim 3, wherein the second characteristic is set such that a gain characteristic in the second frequency region has a characteristic lower than the gain characteristic in the first frequency region and a phase characteristic in the second frequency region has a characteristic delayed from the phase characteristic in the first frequency region.

5. An electrically powered suspension system comprising:

an electromagnetic actuator disposed between a vehicle body and a wheel of a vehicle and configured to generate a driving force related to vibration damping of the vehicle;

an information acquisition unit configured to acquire information on a stroke velocity of the electromagnetic actuator;

a characteristic information storage unit configured to store, in association with a magnitude of the stroke velocity, plural pieces of characteristic information each having a specific filtering characteristic to be applied to the information on the stroke velocity;

a filter processing unit configured to acquire characteristic information having a specific filtering characteristic suitable for the stroke velocity based on the stroke velocity and a storage content of the characteristic information storage unit, and to apply a filtering process to the information on the stroke velocity acquired by the information acquisition unit by applying a filtering process related to the acquired characteristic information;

a target damping force calculation unit configured to calculate a target damping force that is a target value for a damping operation of the electromagnetic actuator based on the stroke velocity having filter processed by the filter processing unit and information on a relationship between the thus filter processed stroke velocity and the damping force; and a drive control unit configured to control driving of the electromagnetic actuator based on the calculated target damping force, wherein the plural pieces of characteristic information have filtering characteristics in a second frequency region, which has a frequency higher than that of a first frequency region containing a sprung resonance frequency and an unsprung resonance frequency, the filtering characteristics comprising a first characteristic information having a specific gain characteristic and a specific phase characteristic, and a second characteristic information set, when the stroke velocity exceeds a predetermined velocity threshold value, such that a gain increases and a phase advances with respect to the first characteristic information.

6. The electrically powered suspension system according to claim 5, wherein the plural pieces of characteristic information comprises the first characteristic information having the specific gain characteristic and the specific phase characteristic directed to ensuring stability of a system control, and the second characteristic information having a gain characteristic and a phase characteristic directed to ensuring responsiveness of the system control, and wherein the first characteristic information is used when the stroke velocity acquired by the information acquisition unit is equal to or less than the predetermined velocity threshold value, and the second characteristic information is used when the stroke velocity acquired by the information acquisition unit is greater than the predetermined velocity threshold value.

7. The electrically powered suspension system according to claim 5, wherein the second characteristic information is set such that a gain characteristic in the second frequency region has a characteristic lower than the gain characteristic in the first frequency region and a phase characteristic in the second frequency region has a characteristic delayed from the phase characteristic in the first frequency region.

8. An electrically powered suspension system comprising:

an electromagnetic actuator disposed between a vehicle body and a wheel of a vehicle and configured to generate a driving force related to vibration damping of the vehicle;

an information acquisition unit configured to acquire information on a stroke velocity of the electromagnetic actuator;

a change rate information storage unit configured to store, in association with a magnitude of the stroke velocity, a change rate data that is information on a rate of change of a target damping force relative to a change in the stroke velocity;

a characteristic information storage unit configured to store, in association with the change rate data based on the stroke velocity, plural pieces of characteristic information each having a specific filtering characteristic to be applied to the information on the stroke velocity;

a filter processing unit configured to acquire characteristic information having a specific filtering characteristic suitable for the change rate data, based on the change rate data on the basis of the stroke velocity and based on a storage content of the characteristic information storage unit, and to apply a filtering process to the information on the stroke velocity acquired by the information acquisition unit by applying a filtering process related to the acquired characteristic information;

a target damping force calculation unit configured to calculate a target damping force that is a target value for a damping operation of the electromagnetic actuator based on the stroke velocity having filter processed by the filter processing unit and information on a relationship between the thus filter processed stroke velocity and the damping force; and a drive control unit configured to control driving of the electromagnetic actuator based on the calculated target damping force, wherein the plural pieces of characteristic information have filtering characteristics in a second frequency region, which has a frequency higher than that of a first frequency region containing a sprung resonance frequency and an unsprung resonance frequency, the filtering characteristics comprising a first characteristic information having a specific gain characteristic and a specific phase characteristic, and a second characteristic information set, when the stroke velocity exceeds a predetermined velocity threshold value, such that a gain increases and a phase advances with respect to the first characteristic information.

9. The electrically powered suspension system according to claim 8, wherein the plural pieces of characteristic information comprises the first characteristic information having the specific gain characteristic and the specific phase characteristic directed to ensuring stability of a system control, and the second characteristic information having a gain characteristic and a phase characteristic directed to ensuring responsiveness of the system control, and wherein the first characteristic information is used when the stroke velocity acquired by the information acquisition unit is equal to or less than the predetermined velocity threshold value, and the second characteristic information is used when the stroke velocity acquired by the information acquisition unit is greater than the predetermined velocity threshold value.

10. The electrically powered suspension system according to claim 8, wherein the second characteristic information is set such that a gain characteristic in the second frequency region has a characteristic lower than the gain characteristic in the first frequency region and a phase characteristic in the second frequency region has a characteristic delayed from the phase characteristic in the first frequency region.

* * * * *